United States Patent [19]

Millikan

[11] Patent Number: 4,799,940
[45] Date of Patent: Jan. 24, 1989

[54] CENTRIFUGAL SYSTEM WITH PUMP FOR SEPARATING AIR FROM FUEL

[75] Inventor: Joseph B. Millikan, Sophia, N.C.

[73] Assignee: Gilbarco, Inc., Greensboro, N.C.

[21] Appl. No.: 205,629

[22] Filed: Jun. 8, 1988

Related U.S. Application Data

[63] Continuation of Ser. No. 113,368, Oct. 21, 1987, abandoned, which is a continuation of Ser. No. 804,831, Dec. 5, 1985, abandoned.

[51] Int. Cl.$^4$ .............................................. B01D 19/00
[52] U.S. Cl. ............................................ 55/52; 55/88; 55/165; 55/203
[58] Field of Search ................... 55/52, 55, 165, 184, 55/199–203, 471

[56] References Cited

U.S. PATENT DOCUMENTS

| | | | |
|---|---|---|---|
| 2,186,069 | 1/1940 | Hazard | 221/67 |
| 2,194,843 | 3/1940 | Bechtold | 221/95 |
| 2,353,206 | 7/1944 | Waugh | 222/72 |
| 2,642,148 | 6/1953 | Grise | 55/178 |
| 2,940,652 | 6/1960 | Adams | 55/88 |
| 2,947,379 | 8/1960 | Aubrey | 55/88 |
| 2,952,329 | 9/1960 | Cunningham et al. | 55/199 |
| 3,054,246 | 9/1962 | Jennings | 55/201 X |
| 3,421,289 | 1/1969 | Adams | 55/88 X |
| 4,088,459 | 5/1978 | Tuzson | 55/203 |
| 4,365,977 | 12/1982 | Egbert | 55/52 X |
| 4,563,198 | 1/1986 | Houtchens | 55/55 X |

FOREIGN PATENT DOCUMENTS

| | | |
|---|---|---|
| 1528678 | 7/1969 | Fed. Rep. of Germany . |
| 2312022 | 9/1973 | Fed. Rep. of Germany . |
| 636712 | 5/1950 | United Kingdom . |

Primary Examiner—Charles Hart

[57] ABSTRACT

An apparatus and method for pumping fuel substantially free of air from a storage tank to a nozzle, includes a vane pump and centrifugal separator bolted together and sharing a common drive shaft, whereby fuel is pumped from said vane pump into a central portion of said centrifuge in parallel with the longitudinal axis of a curved multibladed impeller of said centrifuge while the impeller is rotating, whereafter the rotating impeller creates centrifugal forces to cause air to be extracted from the fuel, the air being directed rearward along the axis of the impeller for delivery to a vent port, and the fuel substantially free of air being driven against the inside wall of the centrifuge and delivered to a fuel outlet port. A sump is connected to the vent port of said centrifugal separator for receiving a rarefired air/fuel mixture therefrom for completing the separation of air from the fuel.

10 Claims, 8 Drawing Sheets

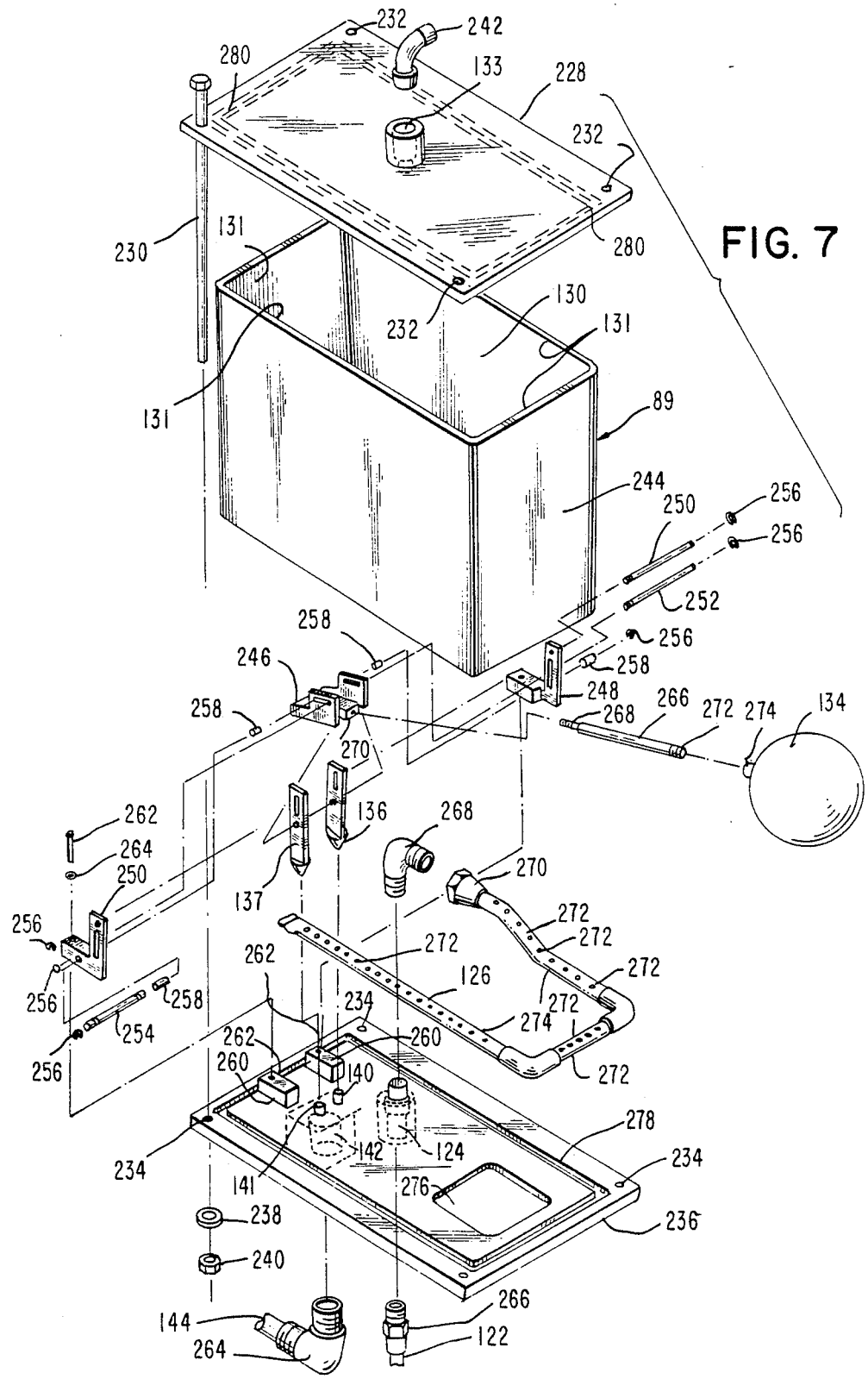

CENTRIFUGAL SYSTEM WITH PUMP FOR SEPARATING AIR FROM FUEL

This application is a continuation of application Ser. No. 113,368, filed 10/21/87, which is a continuation of application Ser. No. 804,831, filed 12/5/85, both of which are now abondoned.

FIELD OF THE PRESENT INVENTION

The field of the present invention relates generally to systems for pumping fuel, and more particularly to such systems which provide for the separation of air from the fuel before the fuel is pumped through a meter for measuring the amount of fuel delivered to a receiving tank.

BACKGROUND OF THE INVENTION

Systems for delivering fuel from a storage tank to a receiving tank typically include a pump for pumping the fuel from the storage tank, through a feed line and meter, to a nozzle for delivery to a receiving tank such as the fuel tank of a vehicle, for example. The meter measures an amount of fuel delivered to the receiving tank for permitting calculation of the cost of the fuel delivered to the receiving tank. If the fuel being so pumped includes a high percentage of air, the typical fuel meter will measure both the amount of fuel and air passing through the meter to the nozzle, causing a customer to be overcharged for the amount of fuel he receives by a factor equivalent to the percentage of air in the fuel passed through the meter. As a result, most industrialized countries set strict standards for the air/fuel ratio permitted for fuel being pumped through a meter for permitting calculation of the price to be charged to a fuel user. For example, typical European weights and measures standards require that the total error caused by air in measuring the amount of fuel being distributed from a pumping system cannot exceed 1.0 percent for diesel fuel, and 0.5 percent for gasoline, when tested with air entries from 0 to 100 percent in the pumping system. It is believed that Australian requirements are the most stringent, setting a standard maximum error of 0.5 percent due to air in measuring the amount of any fuel being pumped or delivered to a user.

One known fuel pumping or distribution system includes a passive type air separation system. In this system, discussed in greater detail below, the fuel/air mixture is delivered from a pump to an air separator housing, in which air floats to the top of the housing via the bouyant force acting on bubbles formed in the fuel in the housing, whereby the air is exited through a vent tube to a sump system. The internal pressure in the sump is at atmospheric pressure, whereas the pressure in the air separator is at a pump discharge pressure (ranges from 20 to 40 psi). The air, being less dense than the fuel, flows towards the zone of lowest pressure. Passive systems are effective for fuel pumping or delivery systems having air flow rates of less than 5 percent of total flow rate. However, such passive systems cannot handle air flow rates of 100 percent air mandated by a weights and measures requirements of many countries.

The present inventor recognized that a passive type system for separating air from fuel is not capable of removing sufficient air from the fuel to meet modern standards. Accordingly, he developed the pumping system of the present invention including a dynamic system for separating air from the fuel.

SUMMARY OF THE INVENTION

In recognition of the various deficiencies in known fuel pumping systems, such as the one previously described, one object of the invention is to provide an improved system for separating air from fuel in a fuel pumping system.

Another object of this invention is to provide a dynamic system for separating air from fuel.

Yet another object of the invention is to provide a new sump system for the final stage of a system for separating air from fuel.

These and other objects are met by providing a centrifugal air separator directly driven by a modified fuel pumping unit, for delivering fuel substantially free of air to a meter, and delivering a light mixture of air and fuel to a sump for completing separation of the air from the fuel, whereby the extracted air is vented to the atmosphere. The invention also provides an improved sump including both inlet manifold means for distributing light fuel containing air onto the walls of the sump for permitting the air in the fuel to dissipate, and two-stage valving means for substantially eliminating fuel overflow from the sump when a large amount of fuel is present within the sump.

BRIEF DESCRIPTION OF THE DRAWINGS

In the drawings, wherein like elements are shown by the same reference number:

FIG. 7 is a pictorial exploded assembly view of the sump unit or system of the preferred embodiment of the present invention;

DESCRIPTION OF THE PREFERRED EMBODIMENTS

Figure 1:
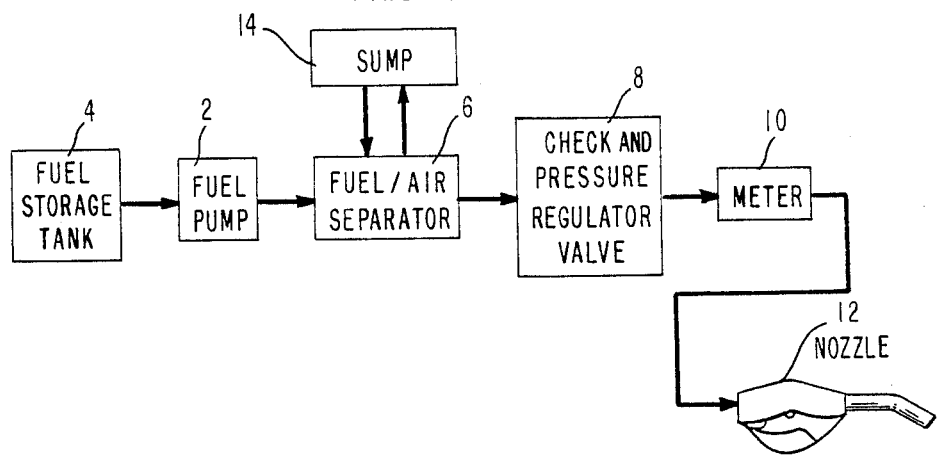
FIG. 1 shows a block diagram of a typical fuel distribution system.

With reference to FIG. 1, a typical fuel pumping or distribution system includes a fuel pump 2 for pumping fuel from a fuel storage tank 4 under pressure to a fuel-/air separator 6. The fuel/air separator 6 operates to separate air from the fuel, and deliver fuel of lesser air content through a check and pressure regulator valve 8 and meter 10 to a nozzle 12 for distribution to a user's fuel tank. Air and tank fuel (fuel having a very high percentage of air) is delivered from the fuel/air separator 6 to a sump 14. The check valve and pressure regulator 8 prevents fuel from draining from the system when the pump is shut off, prevents the meter from turning backwards, and prevents pressure build-up from thermal expansion. The sump 14 operates to further separate air from the fuel, to vent the air from the pumping system, and to deliver rarefied fuel back to the fuel/air separator 6 for further processing.

Figure 2A:
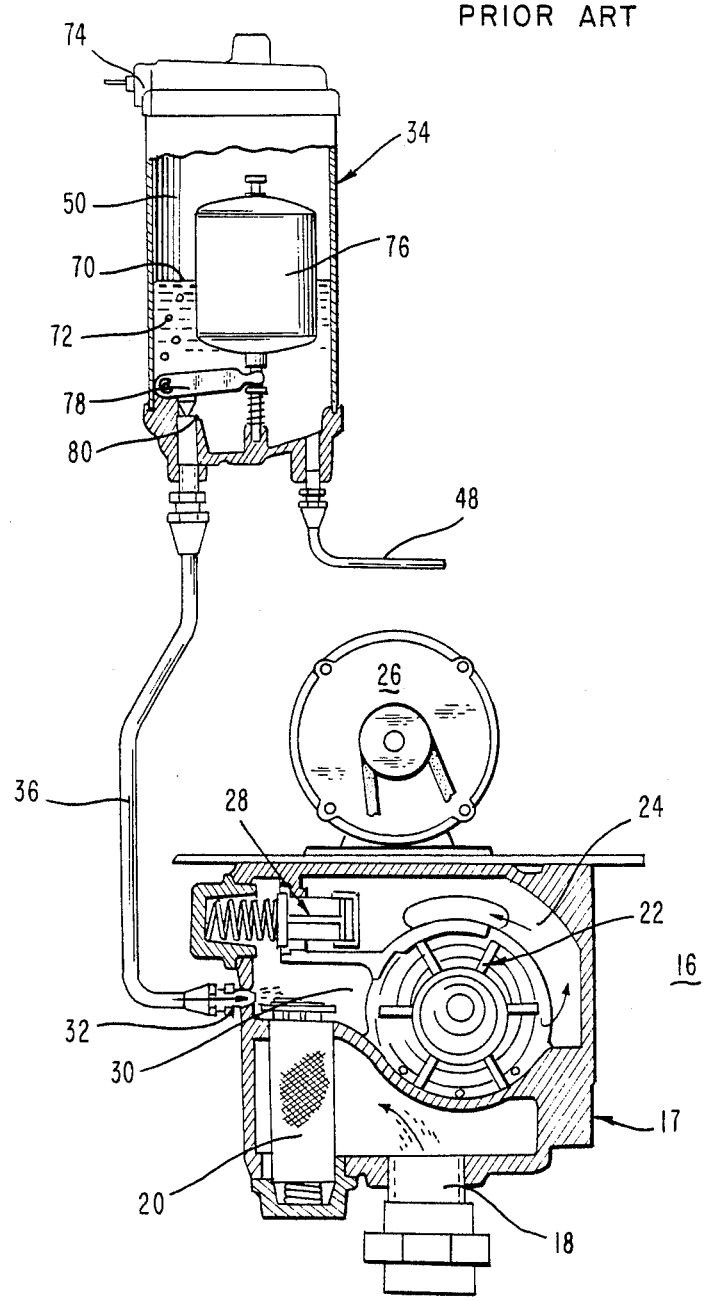
FIGS. 2A and 2B show a cutaway view of a prior fuel pumping system.
Figure 2B:
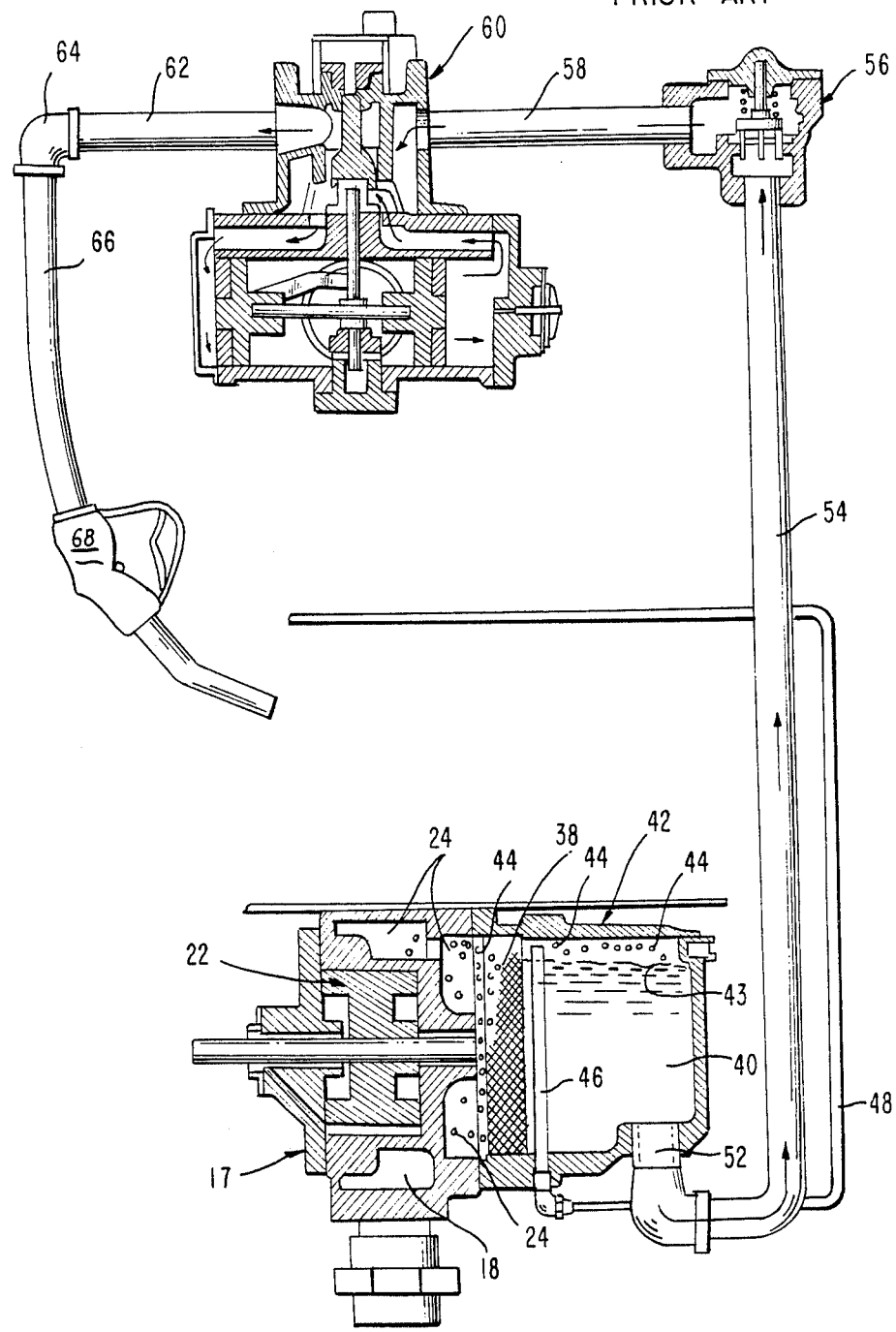

A partial cutaway view of a prior pumping system 10 developed and manufactured by the assignee of the present invention is shown in FIGS. 2A and 2B. Generally speaking, the front view of the prior pump/air separator unit 16 (see FIG. 2A) includes an entry port 18 for sucking fuel from a storage tank through a check valve and/or strainer unit 20 to a rotor 22 of the pump 17 for delivery under pressure into an outlet chamber 24. An electric motor 26 is included to drive the pump rotor 22. Also, a by-pass valve assembly 28 is included to permit fuel under excess pressure to be returned from the outlet chamber 24 back to the inlet port 30 of the rotor 22. A sump return port 32 is provided for receiving excess fuel from a sump unit 34 for return via tubing 36 to the rotor inlet port 30 or inlet chamber of the pump/air separator 16. As shown in the side view (see FIG. 2B) of the pump/air separator 16, the outlet chamber 24 of the pump 17 is connected to a separator filter 38 of the air separator for pumping fuel through the separator filter 38 into the chamber 40 of the air separator 42. The air separator 42 is a passive type of separator, whereby air is separated from the fuel 43 within the chamber 40 of the air separator 42 by permitting a natural flow of air bubbles 44 formed within the fuel 43 to move the bubbles 44 upward to the top portion of the chamber 40 where the air and some fuel is exausted from the chamber into a sump feed line 46 for delivery via tubing 48 to the chamber 50 of the sump system 34. Fuel of substantially lower air content is delivered from a discharge port 52 of the air separator 42 by a fuel feed line 54 to a check valve and pressure regulator assembly 56, and therefrom via another feed line 58 to a meter assembly 60. The fuel flows from the meter assembly 60 via the fuel feed line 62 to a coupling 64 for connection to a fuel hose 66 for delivery to a nozzle 68, as shown. The check valve and pressure regulator 56 can be provided for one range of pressure by a PA0054 pressure regulator valve, manufactured by Gilbarco, Inc., Greensboro, N. C., U.S.A., for example. The meter 60 can be provided by a PA024 meter also manufactured by the Gilbarco, Inc., for example. Fuel 70 of relatively high air content delivered to the sump 34 along with air discharged from the air separator 42 is partially purged of air by the action of air bubbles 72 floating to the surface of the fuel 70 in the sump 34 being dissipated from the fuel 70 and excited through an air vent 74. When more than a predetermined amount of liquid fuel 70 accumulates in the sump 34, a float 76 rises upward lifting a needle valve 78 from its seat 80, for permitting fuel 70 to flow from the sump 34 via the sump return line 36 to the pump 17 for reprocessing. Note that in the air separator 42, a separator filter 38 consisting of screen-like material is provided to assist in separating air from the fuel by forcing air bubbles 44 to float to the top of the fuel 43 in the air separator fuel chamber 40. Experience has shown that this prior system is capable of delivering fuel substantially free of air provided that the air flow rates involved in initiating the pumping of the fuel are less than five percent of the total flow rate of the air and fuel. Note that although various tubing and pipe fittings are shown in the drawings for completeness, such standard hardware is not particularly described herein.

Figure 3A:
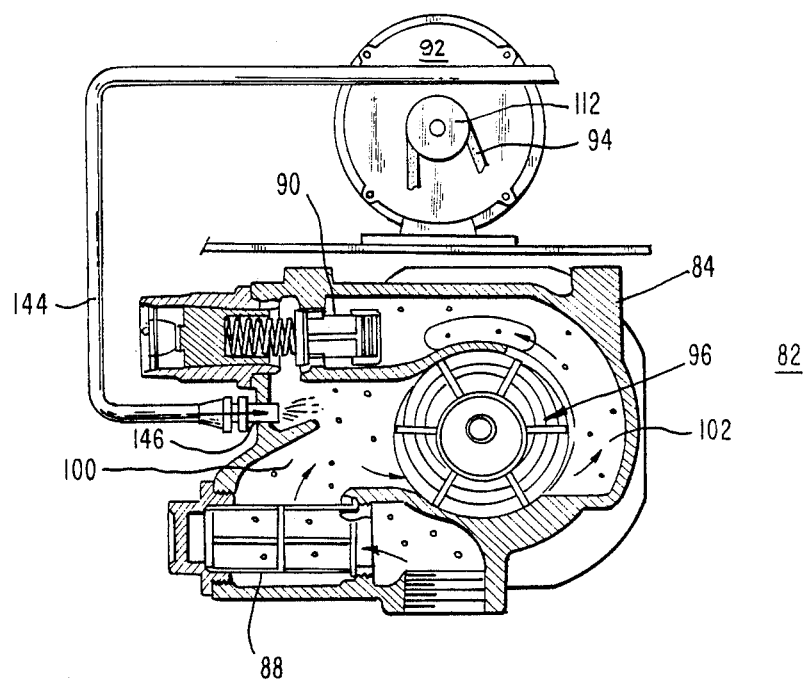
FIGS. 3A and 3B show a cutaway view of the fuel pumping or distribution system of a preferred embodiment of the present invention.
Figure 4:
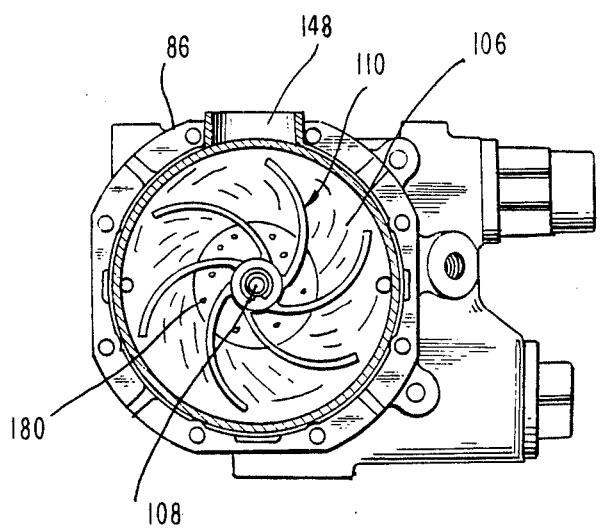
FIG. 4 shows a sectional view taken along A—A of the centrifugal air separator of a preferred embodiment of the invention.
Figure 3B:
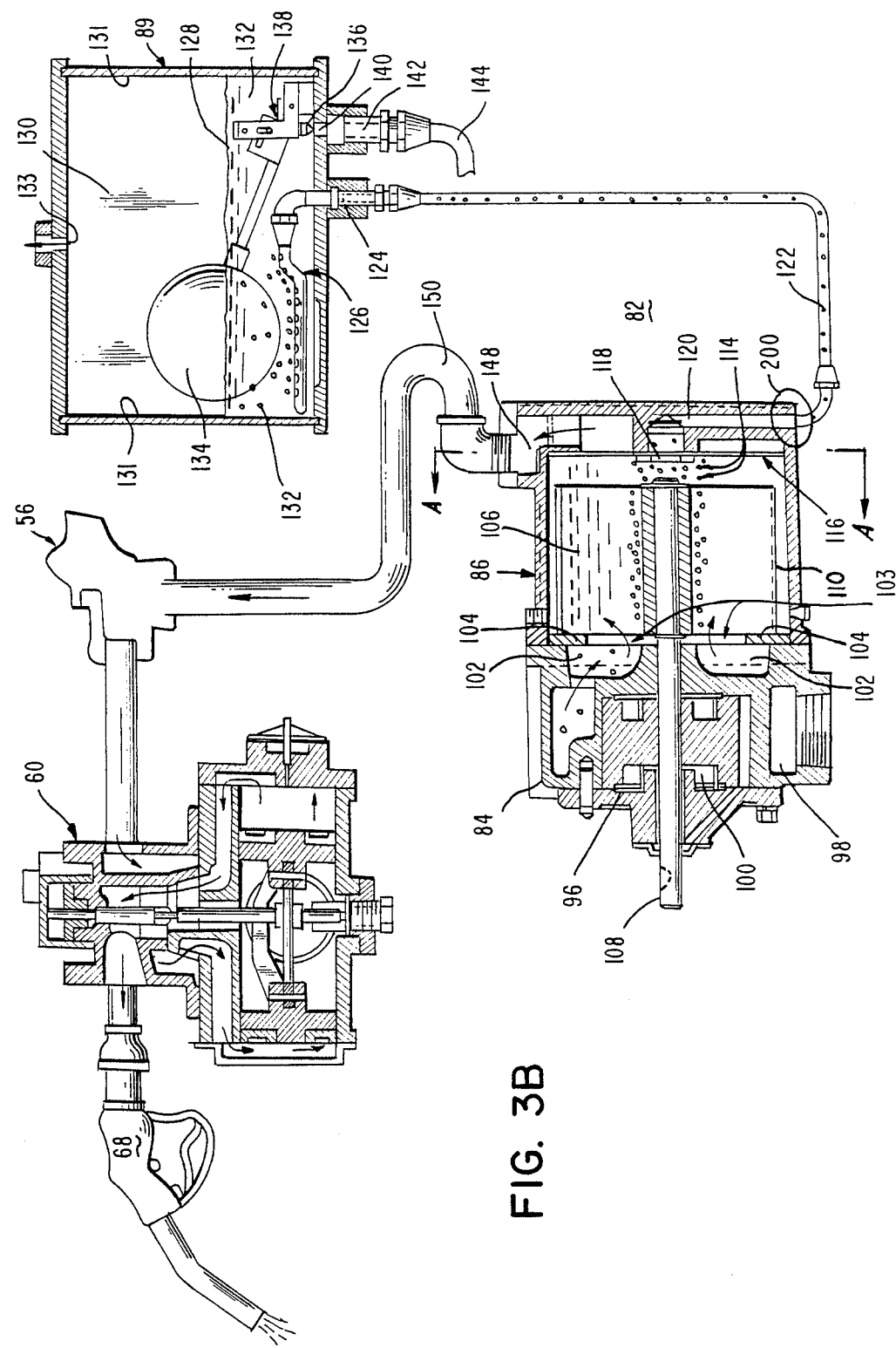

In FIGS. 3A and 3B, a partial cutaway view of the fuel/air separator pumping system 82 of the present invention is shown. For purposes of clarity, a front cutaway view of the pump 84 is shown in FIG. 3A, whereas FIG. 3B shows a side cutaway view of the pump 84, the air separator 86, and sump 89 of the present invention (also shown are the check and pressure regulator valve 56, meter 60, and nozzle 68). The pump 84 is in the preferred embodiment a vane type pump, which is both self-priming and capable of pumping air. The pump 84 is a self-priming pump similar to the pump 17 of FIGS. 2A and 2B, except that the check valve and strainer units 88 and 20, respectively, are different, as is the location of the same in the respective pump housing. The by-pass valves 90 and 28, respectively, are similar except that 90 is adjustable. A motor 92 is connected via a belt 94 to the rotor 96 of the pump 84. The rotor 96 is rotated in the direction shown by the arrow via the electric motor 92 for drawing fuel from a fuel storage tank 4 through an inlet port 98, through the check valve and strainer 88, into rotor inlet port 100, from which it is pumped by the rotor 96 into the outlet chamber 102, as shown. With reference to the side view of the pump-/separator unit 82, the fuel passes from the pump through centrally located hole 103 (see arrows) of a front baffle plate 104 of the air separator 86, to the rotor chamber 106 of the air separator 86. Note that the fuel pressure is developed by van pump 84, whereby fuel under pressure is forced through the baffle plate 104 into the lower pressure region of chamber 106 of air separator 86. The front baffle plate 104 forces the fuel (usually fuel/air mixture) to enter the rotor chamber 106 at the center of the chamber 106 about the common drive shaft 108 for both the pump rotor 96 and the air separator rotor 110 (see FIG. 4 for a view of the air separator rotor or impeller 110). Common drive shaft 108 is connected by a belt 94 and pulley (not shown) to a pulley 112 of the motor 92, whereby the motor 92 rotates both rotors 96 and 110. Rotation of the air separation rotor 110 creates a centrifugal force which causes fuel to be driven to the inner walls of the air separator chamber 106, and air 114 to be separated from the fuel and collected at the central portions of the separator chamber 106 about the drive shaft 108. The separated air 114 moves towards a rear baffle plate 116, where the air 114 is directed via a central hole 118 in the baffle plate 116 for exiting from the air separator 86 out of an air exit port 120 into a sump feed line 122, for delivery to an input port 124 of an improved sump unit 89 of the present invention. Some fuel may also be discharged into the sump feed line 122, whereby this mixture of air and air saturated fuel is injected into the sump chamber via a manifold 126, which sprays the fuel 128 onto the walls 131 of the sump chamber 130, for permitting the entrapped air 132 to dissipate from the fuel 128 and exit from the chamber 130 via the air vent 133. When a first predetermined level of fuel 128 is attained within the sump chamber 130, the float 134 rises to lift a first needle 136 of a two stage valve assembly 138 from its seat 140 for permitting some of the fuel 128 to flow back, via the sump outlet port 142 and sump return line 144, to inlet port 146 and into the pump inlet chamber 100 of the pump 84 for reprocessing. If, even with the needle 136 released from its seat 140 for permitting fuel 128 to return to the pump 84 from the sump chamber 130, fuel 128 continues to rise within the sump chamber 130, the float 134 will obtain a second predetermined higher level in the sump chamber 130, thereby causing a second needle 137 (see FIG. 11) to be lifted away from its seat 141 for permitting a greater flow rate of fuel 128 from the sump chamber 130 into the sump return line 144. The two stage valve assembly 138 of the sump unit 89 of the present invention helps to overcome problems in the operation of the prior sump unit 34, such as fuel overflow, and the suckback of air into the pump 84 from the sump chamber 130. The operation and construction of the sump unit 89 will be described in greater detail in the following paragraphs.

Fuel substantially free of air is delivered from the air separator 86 via the air separator fuel outlet port 148 into a feed line 150 for delivery through a check valve and pressure regulator 56 to a meter 60, and therefrom to a nozzle assembly 68 for delivery to a user's fuel tank (not shown).

Figure 5:
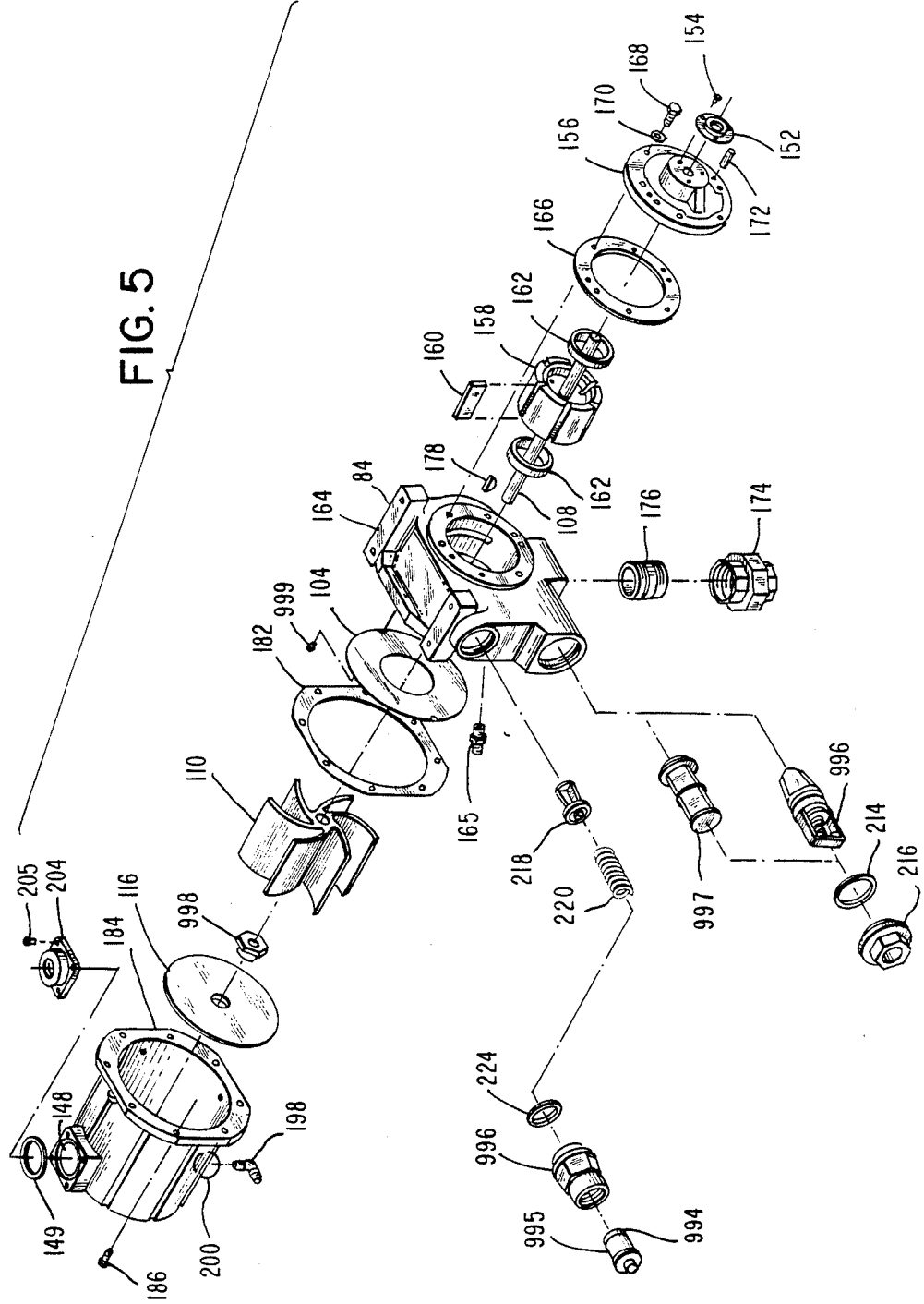
FIG. 5 shows an exploded pictorial assembly diagram of the pump and air separater unit of a preferred embodiment of the present invention.

The combined air separator/fuel pump unit 82 is shown in detail in a pictorial exploded assembly view of FIG. 5. As shown, a lip seal 152 is secured via round head screws 154 to a pump head and bushing assembly 156. A pump rotor and shaft assembly 158 receives six pump blades 160 and two blade spacers 162 as shown and is housed within a pump body 164. A pump gasket 166 is positioned between the pump head and bushing assembly 156 and the pump body 164, whereby the pump head and bushing assembly 156 is secured to the pump body 164 via six bolts 168 and lock washers 170, and two dowel pins 172 for locating means. An inlet union 174 is coupled via a pipe nipple 176 to a threaded inlet port hole 98 (see FIGS. 3A and 3B) of the pump body 164. One end of the shaft 108 is secured via a Woodruff key 178 to the hollow shaft 180 and key way (not shown) in the air separator rotor 110 extrusion. A separator gasket 182 is installed between the air separator housing 184 and the pump body 164. A front baffle plate 104 is attached to the pump body 164 by two screws 999. The air separator housing 184 is attached to the pump body 164 via eight bolts 186 through the air gap housing and separator gasket 182 into threaded holes on the other side of the pump body 164. The rear baffle plate 116 is secured via a hollow bushing 998 to the air separator housing 184. An air outlet fitting 198 is coupled to a threaded hole 200 of the air separator housing 184, whereby the threaded hole 200 is the remainder of the outer portion of hole 120; the remainder of the hole 120 runs radially through the air separator housing 184 to the center thereof, exiting therefrom into axial hole 121 of the protruding hub 202 of the air gap housing 184. A discharge flange 204 is secured with "0" ring 149 to the fuel discharger port 148 of the Air Separator housing 184 via four screws 205. Either a strainer 997 or strainer/check valve assy 996 is mounted in the suction side of the pump body 164. Lastly, by-pass valve unit 90 of pump 84 consists of pressure release by-pass valve 218, a release valve spring 220, an "0" ring 224, adjustment chuck 996, adjustment plug 995, and an "0" ring 994. Also, a return fitting 165 is provided for connecting the pump 84 to the sump return line 144.

Figure 6:
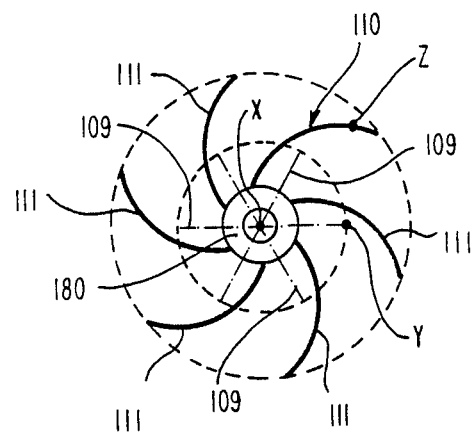
FIG. 6 shows a layout diagram in designing the impeller of the air separater unit used in the preferred embodiment of the present invention.

With reference to FIG. 6, the layout and method and design of the curved vanes 111 of the impeller or air separator rotor 110 is shown. In the preferred embodiment of the invention, the vanes 111 are designed as follows (note that this method of design was taken from "Audel - PUMPS", by Harry L. Stewart, 2nd Edition, 1984, page 126, as published by The Bobbs-Merriel Co., Inc.):

1. Draw two concentric circles about shaft 180 as shown in phantom.
2. Divide the inner circle into a number of arms 109 representing equidistant radii from the origin or center X (in this example, 6 arms 109 are shown).
3. Bisect each radius or arm 109 as shown at a point Y.
4. Use the bisect points Y as a center point, and use a radius YZ, for describing the curves which represent the working basis of the vanes 111.
5. The mathematical relation between X, Y and Z is as indicated below in equation (1).

$$YZ = XY + 1/6 \, XY \tag{1}$$

With reference to FIG. 7, a more detailed description of the preferred embodiment for the sump 89 will now be given. As shown in the exploded pictorial assembly diagram of FIG. 7, the sump includes a sump casing weldment 244, a top plate weldment 228, providing a top cover for the sump 89 which is secured to the sump casing weldment 244 via four hexhead bolts 230 that are inserted through holes 232 of the top plate 228, and therefrom through holes 234 in a bottom plate weldment 236 providing the base of the sump 89. The bolts 230 are secured via lockwashers 238 and nuts 240, as shown. An air vent port 133 is provided on the top plate weldment 228 for receiving an air vent fitting 242, through which air is vented from the sump chamber 130. The sump casing weldment 244 is secured between the top plate weldment 228 and the bottom plate weldment 236, as shown. A two stage valve assembly 138 (see FIG. 3B) includes a first needle or first stage plunger 136, a second needle or second stage plunger 137, a valve guide 246, a right-hand valve guide support 248, a left-hand valve guide support 250, first through third valve shafts 250, 252, and 254, respectively, retaining rings 256 for retaining the valve shafts 250, 252, and 254, Oilite bearings 258 for receiving the aforesaid valve shafts, retaining blocks 260 each having a threaded hole 262 for rigidly securing the right hand and left hand valve guide supports 248 and 250 to the bottom plate weldment 236 via machine screws 262 and lock washers 264, a valve lever 266 having a threaded end 268 secured to a threaded hole 270 of valve guide 246, and another threaded end 272 secured to a threaded bushing 274 of float 134, a seat 141 for receiving the second needle or second stage plunger 137, the components being assembled together as shown. An outlet fitting 264 is secured to the outlet port 142, and an inlet fitting 266 is secured to the inlet port 124. A flared tube inlet fitting 268 is secured at one end to the interior portion of the inlet port 124, and at its other end to the inlet manifold 126 via the coupling nut fitting 270. Note that the inlet manifold 126 is fabricated from tubing of appropriate materials such as copper, wherein a series of spray holes or jet holes 272 are provided as shown (more or less holes may be provided depending upon the application). Also, the holes or jets 272 are oriented at an angle about the tubing 274 of the inlet manifold 126 for spraying fuel directly onto the inner walls 131 of the sump casing weldment 244. A recessed area 276 is provided in the bottom plate weldment 236 for allowing increased travel for the float 134 while minimizing the height of the sump casing weldment 244. A groove 278 is provided in the bottom plate weldment 236 for both receiving and locating the bottom edge of the subcasing weldment 244 on the bottom plate weldment 236. Similarly, a groove 280 is provided on the inside surface of the top plate weldment 228 for both receiving and locating the top edge of the sump casing weldment 244 (note that the groove 280 is of course shown in the phantom due to its location on the bottom face of the top plate weldment 228). Sealing means such as silicon rubber, an O-ring seal, or other appropriate gasket type material is used to provide a liquid tight seal between the top plate weldment 280, bottom plate weldment 236, and sump casing 244 (note that the gasket material may be included in the groove 278 of the bottom plate 236, and groove 280 of the top plate 228). In this example, the gasket material must be impervious to gasoline.

With further reference to FIG. 7, in this example, the inlet tube manifold 126 was fabricated with 31 holes turned 45° upward from the horizontal in order to broadly distribute the air/fuel mixture delivered to the manifold 126 from the air separator 86. As previously mentioned, fuel is sprayed from the holes 272 of manifold 126 onto the walls 131 of the sump casing 244. Relative to the prior sump 34 shown in FIG. 2A, the present preferred sump 89 can be used both with standard and high flow rate fuel distribution units, and provides an increased liquid surface area for completing the extraction of air from the fuel (the prior sump 34 provided an 8.4 square inch liquid surface area, whereas the present improved sump 89 provides a 23.5 square inch liquid surface area), provides an increased flow rate of fuel through the sump 89, and includes a two-stage valving mechanism 138 for preventing the overflow of fuel from the sump 89. Also, the float 134 of the present sump 89 is mounted on moment arm 266 for reducing the size of the required float relative to the prior sump 34, and increasing the liquid surface area. The two-stage valve mechanism 138 is also designed to increase the fluid flow and reduce the fuel pressure opening force to more readily permit fuel to flow back to the pump 84 from the sump 89.

Figure 8:
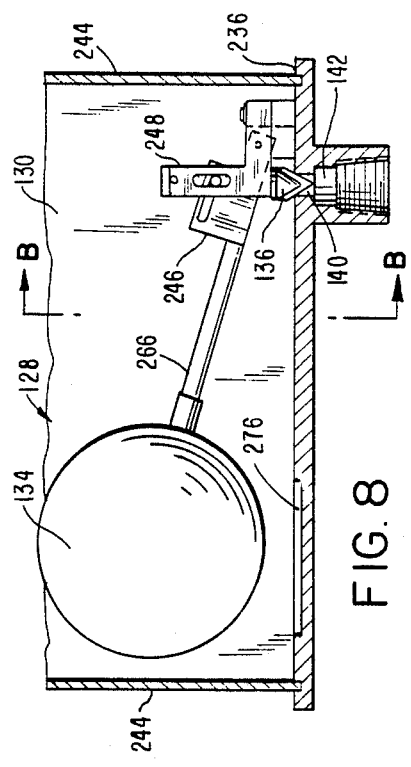
FIG. 8 is a cutaway view showing a "first stage of operation" of the two-stage valve mechanism of the sump system of FIG. 7.
Figure 10:
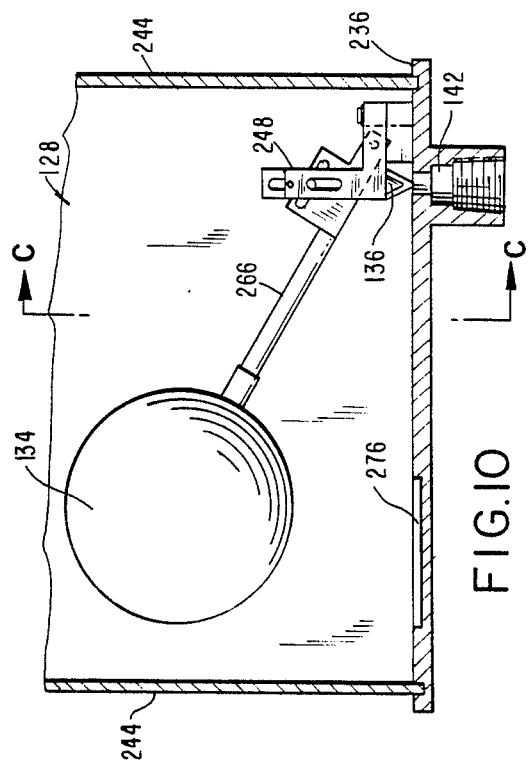
FIG. 10 is a cutaway view of a "second stage of operation" of the two-stage valving system of the sump unit of FIG. 7.
Figure 9:
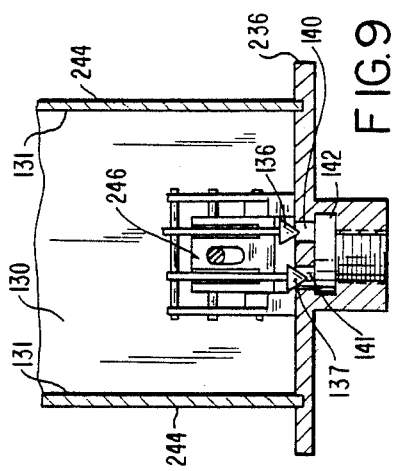
FIG. 9 is a sectional view taken along B-B of FIG. 8.
Figure 11:
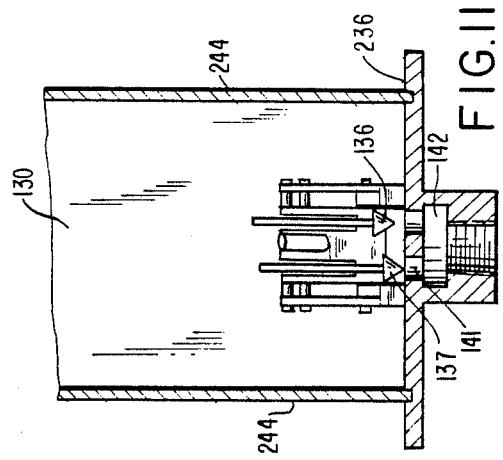
FIG. 11 is a view taken along section C-C a cutaway view of the valving system shown in FIG. 10.

FIGS. 8 through 11 illustrate the operation of a two-stage valve assembly 138. In FIG. 8, a sufficient amount of volume of fuel has entered the sump 89 to raise the float 134 upward to a position where the first stage plunger 136 is raised from its seat 140, for permitting fuel to begin flowing back from the sump 89 to the pump 84. FIG. 9 is a sectional view taken along B—B showing operation of the first stage of the two-stage valve mechanism 138. If additional fuel enters the sump chamber 130, the float 134 will raise to an even higher position than in FIG. 8, causing the second stage plunger 137 to be lifted from its seat 141, as shown in FIG. 11. Such action permits additional fuel (a maximum rate of flow) to flow from the sump 89 back to the pump 84, thereby preventing overflow of the fuel from the sump 89. However, in many applications, the prior sump 34 shown in FIG. 2A may be adequate when used in combination with the air separator 82 of the present invention, for meeting the air/fuel ratio standards of the country or state where the fuel distribution system is to be used. Clearly, the prior sump 34 is much simpler in design, ad therefore more economical than the sump 89 of the preferred embodiment of the invention. Contrarywise, in countries such as Australia, as previously mentioned, it may be necessary to use the preferred sump 89 in order to meet the very stringent Australian air/fuel standards.

Although various embodiments of the present invention, including preferred embodiments, have been shown and described, other embodiments of the invention may be realized by those skilled in the art, which other embodiments do not depart from the spirit and scope of the appended claims.

What is claimed is:

1. Apparatus for both pumping a liquid and removing air from the liquid to permit accurate measurement of the volume of liquid being pumped, comprising:

vane pump means for pumping a liquid, said vane pump means including an inlet port, a drive shaft, and an outlet chamber, and a rotor rigidly mounted upon said drive shaft, said drive shaft extending outward from said outlet chamber, said vane pump means producing a relatively high pressure liquid flow at said outlet chamber compared to said inlet port; and Centrifuge means for separating air from said liquid, said centrifuge means including curved blade impeller means rigidly mounted upon the extension of said drive shaft from said vane pump means, a front baffle plate rigidly connected to said vane pump means and covering said outlet chamber thereof, said drive shaft extending through a centrally located hole in said front baffle plate, a centrifuge chamber casing rigidly attached to said front baffle plate and enclosing said impeller means, a liquid outlet port located on the side of said casing rearward from said front baffle plate, an end cap rigidly connecting across the back of said casing, and a rear baffle plate rigidly connected to said end cap between said end cap and said impeller means, sad rear baffle plate having a centrally located hole positioned opposite the end of said drive shaft and concentric with a centrally located vent hole in said end cap, said curved blade impeller means being arranged for causing the liquid and air to enter a relatively low pressure region within said centrifuge chamber casing in a direction parallel with and adjacent the longitudinal axis of said impeller means, said impeller means causing air to be separated from the liquid, the air being force at lowered pressured rearward along a central axial portion of said impeller for exiting into the hole in said rear baffle plate for entry into and venting from said vent hole of said end cap, the liquid substantially free of said air being forced at increased pressure against an inside wall of said centrifuge chamber casing for delivery to said liquid outlet port at relatively higher pressure than said air, metering means coupled to said liquid outlet port for measuring liquid flowing from said outlet port substantially free of said air, and sump means connected to said vent hole or said end cap of said centrifuge means for receiving both low pressure air and residual liquid from said centrifuge means, for completing the removal of air from said liquid by permitting the air to "bubble-up" and out of the residual liquid.

2. The apparatus of claim 1, wherein said sump means includes:

a casing consisting of side walls, a top, and a bottom; and manifold means located within said casing for receiving the air and residual liquid from said centrifuge means, and spraying the liquid onto the walls of said casing, thereby providing a greater surface area of liquid for enhancing the dissipation of air from the residual liquid.

3. The apparatus of claim 1, wherein said sump means includes:
   valve assembly means for detecting a predetermined level of liquid within said sump means, for permitting liquid to flow back from said sump means to another inlet port of said vane pump means until the level of liquid is below said predetermined level, for reprocessing the returned liquid, thereby both preventing overflow of liquid from said sump means and permitting the reprocessing of excess liquid.

4. The apparatus of claim 2, wherein said sump means further includes:
   valve assembly means for detecting a predetermined level of liquid within said sump means, for permitting liquid to flow back from said sump means to another inlet port of said vane pump means until the level of liquid is below said predetermined level, for reprocessing the returned liquid, thereby both preventing overflow of liquid from said pump means and permitting the reprocessing of excess liquid.

5. The apparatus of claim 1, wherein said sump means includes:
   two-stage valve assembly means for detecting said liquid exceeding a first or second successively higher predetermined levels of liquid in said sump means, for permitting the liquid to drain back at a first flow rate to another inlet port of said vane pump means, when the liquid is above said first and below said second predetermined levels, and to drain back at a second flow rate higher than the first flow rate whenever the liquid level is above said second predetermined level, thereby preventing overflow of said sump, substantially reducing the possibility of said vane pump sucking air from said sump, and reducing the fuel pressure opening force for said valve assembly means relative to a single stage valve assembly, for more readily permitting liquid to flow back to said sump means.

6. The apparatus of claim 2, wherein said sump means further includes:
   two-stage valve assembly means, for detecting said liquid exceeding a first or a second successively higher predetermined levels of liquid in said sump means for permitting the liquid to drain back at a first flow rate to another inlet port of said vane pump means, when the liquid is above said first and below said second predetermined levels, and to drain back at a second flow rate higher than the first flow rate whenever the liquid level is above said second predetermined level, thereby preventing overflow of said sump, substantially reducing the possibility of said vane pump sucking air from said sump, and reducing the fuel pressure opening force for said valve assembly means relative to a single stage valve assembly, for more readily permitting liquid to flow back to said sump means.

7. The apparatus of claim 5, wherein said two-stage valve assembly means further includes:
   a single float for rising with rising liquid in said sump means, (a) for lifting a first plunger from a first seat located on the bottom of said casing whenever the liquid exceeds said first predetermined level but is below said second predetermined level, permitting liquid to flow at a first rate to said vane pump means, and (b) for also lifting a second plunger from a second seat located on the bottom of said casing, whenever the liquid exceeds said second predetermined level, for permitting a second rate of flow greater than said first rate of liquid back to said vane pump means for the period of time the liquid in said pump means is above said second predetermined level.

8. The apparatus of claim 6, wherein said two-stage valve assembly means further includes:
   a single float for rising with rising liquid in said sump means, (a) for lifting a first plunger from a first seat located on the bottom of said casing whenever the liquid exceeds said first predetermined level but is below said second predetermined level, permitting liquid to flow at a first rate to said vane pump means, and (b) for also lifting a second plunger from a second seat located on the bottom of said casing, whenever the liquid exceeds said second predetermined level, for permitting a second rate of flow greater than said first rate of flow of liquid back to said vane pump means for the period of time the liquid in said sump means is above said second predetermined level.

9. Apparatus for both pumping a liquid and removing air therefrom to permit accurate measurement of the volume of liquid being pumped, comprising:
   motor means for providing rotational energy to said apparatus;
   drive shaft means for receiving rotational energy from said motor means;
   vane pump means driven by said motor means for providing a self-priming pump for pumping any one of liquid, air, or a mixture of liquid and air, said vane pump means including:
     housing means including an inlet port for receiving any one of said liquid, or said air, or a mixture of liquid and air, and an outlet chamber for discharging the aforesaid;
     rotor means mounted upon a forward portion of said drive shaft means within said first housing means, for upon rotation "sucking" said liquid, or air, or mixture thereof from said inlet port and delivering the same under increased pressure to said outlet chamber, said outlet chamber being concentric with and about said drive shaft, the latter protruding therefrom; and
   centrifuge means for separating air from said liquid, said centrifuge means including:
     a cylindrical housing;
     a front baffle plate having a centrally located hole, said front baffle plate being rigidly connected across the front of said cylindrical housing and bolted to a back surface of said housing means of said vane pump means, said hole of said front baffle plate being both concentric with said drive shaft, and located for providing a passageway between said outlet chamber of said vane pump means and the interior of said cylindrical housing, said drive shaft protruding from said vane pump means through the hole of said baffle plate and into the interior of said cylindrical housing;
     an impeller having curved blades for providing lowered pressure passage along the central portion thereof and increased pressure passage at the extremities thereof, said impeller being rigidly mounted upon said drive shaft for rotation within said cylindrical housing; a rear baffle plate positioned across the back of said cylindrical housing, said rear baffle plate having a centrally located hole;

an end cap bolted to the back of said cylindrical housing, said end cap having a protruding centrally located hub on its inside face, and a centrally located air vent hole in said hub leading into a radially located air vent hole through said end cap, said rear baffle plate being bolted to said hub with their respective centrally located holes being concentric to one another;

an outlet port located towards the rear on the side of said cylindrical housing; and sump means connected to said vent hole of said end cap of said centrifuge means for receiving both low pressure air and residual liquid from said centrifuge means, for completing the removal of air from said liquid by permitting the air to "bubble-up" and out of the residual liquid;

whereby upon rotation of said drive shaft, said vane pump means sucks liquid from a storage tank coupled to said inlet port of the former, and forces said liquid under pressure through the hole in said front baffle plate into said centrifuge means, where said rotating impeller causes air to be separated from said liquid and moved axially along the central portion of said impeller for exiting through the hole in said rear baffle plate at decreased pressure, and into the vent hole of said end cap of said centrifuge for venting from said centrifuge means into said sump means, said rotating impeller also causing liquid substantially free of air to be forced radially outward from said impeller against the interior surface of said cylindrical housing, for exiting therefrom into said outlet port at increased pressure for distribution, and metering means coupled to said outlet port for measuring liquid flowing from said outlet port substantially free of air.

10. A method for separating air from a liquid so as to permit accurate measurement of the volume of the liquid, using an apparatus including a vane pump rigidly attached to a centrifugal liquid/air separator, said separator including an impeller within a chamber, a liquid, inlet port, and an air vent port centrally located on a back face of said separator, said vane pump and separator having a common drive shaft, said vane pump including an inlet port for receiving liquid, and an outlet chamber, said method comprising the steps of:

pumping liquid and air from said inlet port into said outlet chamber at a relatively high pressure;

delivering said liquid and air into a relatively low pressure central area of said chamber in parallel with the longitudinal axis of said centrifugal separator while said impeller is rotating;

directing relatively low pressure air extracted from said liquid axially and liquid combined with air along centrally located portions of said impeller into said air vent port;

directing relatively high pressure liquid substantially free of air from the interior walls of said separator into said liquid outlet port for delivery under pressure to a receiving point;

measuring liquid flowing from said outlet port substantially free of air; and venting said low pressure air and liquid combined with air into a sump having a free surface of liquid for allowing said air to escape from said liquid.

* * * * *